US012313450B2

(12) United States Patent
Richards et al.

(10) Patent No.: US 12,313,450 B2
(45) Date of Patent: May 27, 2025

(54) MOUNTING STRUCTURE FOR A VIBRATION SENSING SYSTEM

(71) Applicant: Hawk Measurement Systems Pty. Ltd., Melbourne (AU)

(72) Inventors: Les Richards, Melbourne (AU); Ravi Vivekanantham, Melbourne (AU)

(73) Assignee: Hawk Measurement Systems Pty. Ltd., Nunawading (AU)

( * ) Notice: Subject to any disclaimer, the term of this patent is extended or adjusted under 35 U.S.C. 154(b) by 359 days.

(21) Appl. No.: 17/770,037

(22) PCT Filed: Oct. 19, 2020

(86) PCT No.: PCT/AU2020/051124
§ 371 (c)(1),
(2) Date: Apr. 18, 2022

(87) PCT Pub. No.: WO2021/072508
PCT Pub. Date: Apr. 22, 2021

(65) Prior Publication Data
US 2022/0397450 A1 Dec. 15, 2022

(30) Foreign Application Priority Data
Oct. 17, 2019 (AU) ................. 2019903916

(51) Int. Cl.
*G01H 9/00* (2006.01)
*B65G 13/00* (2006.01)

(52) U.S. Cl.
CPC ............ *G01H 9/004* (2013.01); *B65G 13/00* (2013.01); *B65G 2203/0266* (2013.01)

(58) Field of Classification Search
USPC ........................................ 73/655
See application file for complete search history.

(56) References Cited

U.S. PATENT DOCUMENTS 4,959,539 A 9/1990 Hofler et al.
7,282,697 B2 10/2007 Thomas et al.

FOREIGN PATENT DOCUMENTS

| CN | 101893456 A | 11/2010 | |
| CN | 205192608 U | 4/2016 | |
| DE | 69937627 T2 * | 3/2008 | ........... G02B 6/4201 |

(Continued)

OTHER PUBLICATIONS

PCT International Search Report and Written Opinion, PCT Application No. PCT/AU2020/051124, Nov. 27, 2020, eight pages.

*Primary Examiner* — Clayton E. LaBalle
*Assistant Examiner* — Warren K Fenwick
(74) *Attorney, Agent, or Firm* — Fenwick & West LLP; Daniel R. Brownstone

(57) ABSTRACT

Described herein is an optical fibre mounting structure (180) for fibre vibration sensing of a distributed system (100) of spaced apart vibration sources (112-131). Mounting structure (180) includes a base portion (200) having a two dimensional surface area defining a vibration surface (202). A mounting apparatus (236) is adapted to mount the base portion (200) to a support structure (e.g. 104) of the distributed system (100) adjacent one of the vibration sources. A fibre engagement structure (e.g. 210-215) is provided for supportively engaging a length (218) of optical fibre in contact with the vibration surface (202).

18 Claims, 14 Drawing Sheets

(56) References Cited

FOREIGN PATENT DOCUMENTS

| | | | | |
|---|---|---|---|---|
| EP | 2544035 A1 * | 1/2013 | ........... | G02B 6/4452 |
| JP | H02107927 A | 4/1990 | | |
| JP | 2002152937 A | 5/2002 | | |
| JP | 4665779 B2 | 4/2011 | | |
| RU | 2480798 C2 * | 4/2013 | ........... | G02B 6/4455 |
| WO | WO-2017136869 A1 * | 8/2017 | ......... | G01D 5/35374 |

* cited by examiner

| Conveyor Stringer  | Fibre Optic Cable (FOC)  | HAWK Fibre Casing (HFC)  | Magnetic Clamp  | TEK Screw  | Saddle Clip  |

Bituminous Anti-Corrosion Patch

MOUNTING STRUCTURE FOR A VIBRATION SENSING SYSTEM

FIELD OF THE INVENTION

The present application relates to vibration sensing and in particular to optical fibre sensing of systems of distributed vibration sources.

Embodiments of the present invention are particularly adapted for providing a mounting structure for supportively engaging a length of optical fibre in an operable position proximal to a vibration source. However, it will be appreciated that the invention is applicable in broader contexts and other applications.

BACKGROUND

All mechanically driven systems lose energy through vibrations. Over a period of operation, vibrational energy loss gives rise to machine part failure, which is costly and time intensive to rectify. In conveyor systems, failures in belt rollers can cause significant damage to the surrounding system and cause safety concerns to personnel. It is advantageous to be able to monitor the performance of machine parts over time to provide an ability to implement preventative maintenance.

One way of performing vibration sensing and monitoring across a distributed system of vibration sources (such as a conveyor system) is through a method called distributed fibre optic acoustic sensing (DAS). This method involves remotely monitoring the spectral signatures of optical signals transmitted along an optical fibre that is mounted on or adjacent the vibrating element of a mechanical system. The optical signals are sensitive to variations in vibration, strain and temperature imposed on the optical fibre and these variations can be observed in the optical spectra detected at an associated signal receiver.

In conveyor systems, as in many mechanical systems, vibrations from the system itself are transferred into the surrounding mechanical support structures. The system vibrations will vary according to various factors such as the mechanical construction, the type of materials employed in its construction, the amount of loading and the extent of any adverse performance of the system itself.

Some conveyor systems, via their construction, are less suitable for allowing the use of fibre sensing as a means of performing vibration, strain or temperature monitoring. The implementation of certain monitoring approaches is often made difficult by hazardous environmental conditions or the lack of access. The vibrations specifically of interest are the vibrations present under loaded, semi-loaded and non-loaded conditions and the subsequent effect on the idlers (passive rollers) and the mechanical construction of the conveyor.

The vibration transfer is heavily influenced by the various system structures and fibre positioning and fibre length relative to where the vibration occurs. The sensing fibre cannot always be placed in a position best suited for vibration sensing but must be placed in a position applicable and practical for normal maintenance and change-out demands of a typical conveyor system.

The inventors have identified that this presents a problem in the possible vibrational magnitude and therefore the ability of any sensing device to accurately determine vibration characteristics. In particular, it can be difficult to distinguish the characteristics of any abnormal vibrations within the mechanical design of the conveyor system from the accompanying background vibrational outcomes deemed to be normal.

Any discussion of the background art throughout the specification should in no way be considered as an admission that such art is widely known or forms part of common general knowledge in the field.

SUMMARY OF THE INVENTION

In accordance with a first aspect of the present invention, there is provided an optical fibre mounting structure for fibre vibration sensing of a distributed system of spaced apart vibration sources, the mounting structure including:
- a base portion having a two dimensional surface area defining a vibration surface;
- a mounting apparatus adapted to mount the base portion to a support structure of the distributed system adjacent one of the vibration sources;
- a fibre engagement structure for supportively engaging a length of optical fibre in contact with the vibration surface.

In some embodiments, the base portion includes a substantially planar structure. In one embodiment, the planar structure includes a rectilinear plate. In another embodiment, the planar structure includes a disk. In other embodiments, the base portion is a curved surface.

In some embodiments, the fibre engagement structure includes one or more guide formations disposed at different locations on the base portion. In some embodiment, the guide formations include guide pins extending outwardly from different locations of the base portion. In other embodiments, the guide formations include guide apertures disposed in the base portion at different locations and adapted to receive respective guide bolts. In some embodiments, the guide formations are positioned at locations substantially around a loop structure. In other embodiments, the guide formations are positioned at locations substantially along an inner loop structure and an outer loop structure.

In some embodiments, the mounting structure includes a cover portion having a mating surface which opposes the vibration surface. During operation, the cover portion is able to be brought into clamping engagement with the base portion such that the length of optical fibre is supported in contact with both the mating surface and vibration surface.

In some embodiments, the cover portion includes one or more securing formations for securing the cover portion to the base portion. In some embodiments, the one or more securing formations include a plurality of first apertures disposed in the cover portion for receiving respective bolts for securing the cover portion to the base portion.

In some embodiments, the base portion includes a plurality of second apertures at locations such that, when the cover portion and base portion are brought into clamping engagement, respective ones of the first and second apertures are aligned to collectively receive the respective bolts.

In some embodiments, the base portion includes a plurality of securing bolts at locations such that, when the cover portion and base portion are brought into clamping engagement, respective ones of the securing bolts are received in corresponding ones of the first apertures.

In some embodiments, the one or more securing formations includes one or more bolts projecting from the cover portion and positioned to be received in a respective one or more receiving apertures disposed in the base portion when the cover portion and base portion are brought into clamping engagement.

In some embodiments, the cover portion or base portion include one or more magnets or magnetic regions positioned to bring the opposing portion into magnetic clamping engagement when in close proximity.

In some embodiments, the base portion and cover portion are substantially like in shape.

In some embodiments, the mounting apparatus includes a bolt which extends through an aperture in the base portion and is engagable with a corresponding mounting formation of the support structure.

In some embodiments, the mounting apparatus includes a mounting bolt which extends through both the base portion and cover portion and is engagable with a corresponding mounting formation of the support structure, wherein, during a mounting operation, the mounting bolt is configured to bring the base portion and cover portion into clamping engagement to support the length of optical fibre.

In some embodiments, the base portion includes an elongated cylindrical member having a circumferential surface defining the vibration surface. In some embodiments, the cylindrical member forms part of a pulley wheel structure having an outer surface defining the vibration surface. Preferably, the pulley wheel structure includes a circumferentially extending groove defining, at least in part, the fibre engagement structure.

In some embodiments, the base portion includes an elongated hyperboloid member having a circumferential surface defining the vibration surface. Preferably, the hyperboloid member includes a central waist region intermediate two end regions, wherein the waist region has a diameter narrower than the two end regions and defines, at least in part, the fibre engagement structure.

In some embodiments, the vibration surface includes a helical thread structure adapted to receive at least a portion of the length of optical fibre.

In some embodiments, the fibre engagement structure is formed on the base portion. In some embodiments, the fibre engagement structure includes a contoured surface.

In some embodiments, the distributed system of spaced apart vibration sources includes a conveyor system having a plurality of spaced apart rollers representing the vibration sources.

In one embodiment, the mounting structure includes an elongate channel member having a bottom section and sidewalls extending upwardly from the bottom section, wherein:
the base portion forms a bottom section of the channel member;
the fibre engagement structure is defined, at least in part, by sidewalls of the channel member; and
the length of optical fibre is able to be supportively engaged in a channel defined by the bottom section and sidewalls of the channel member.

In some embodiments, the sidewalls of the channel member extend substantially perpendicularly from the bottom section to define a U shaped channel member. Preferably, distal ends of the sidewalls include inwardly directed retaining lips.

In some embodiments, the mounting apparatus includes one or more magnetic clamps configured to magnetically engage with the support structure about the elongate channel member. The one or more magnetic clamps may be U shaped. In some embodiments, the mounting structure includes one or more engagement clips configured to engage with the support structure about the elongate channel member by one or more screws.

BRIEF DESCRIPTION OF THE FIGURES

Example embodiments of the disclosure will now be described, by way of example only, with reference to the accompanying drawings in which.

DESCRIPTION OF THE INVENTION

Embodiments of the present invention will be described with reference to a conveyor system having a plurality of passive and/or actively driven mechanical rotatable rollers for driving linear movement of a conveyor belt. In this system, the rollers represent the sources of mechanical vibrations. However, it will be appreciated that the present invention is applicable more broadly to geophysical systems, perimeter security, oil and gas distribution systems, electrical transformers, turbines, mining equipment, pumps and transmission systems, roads, railways and tunnels.

System Overview

Figure 1:
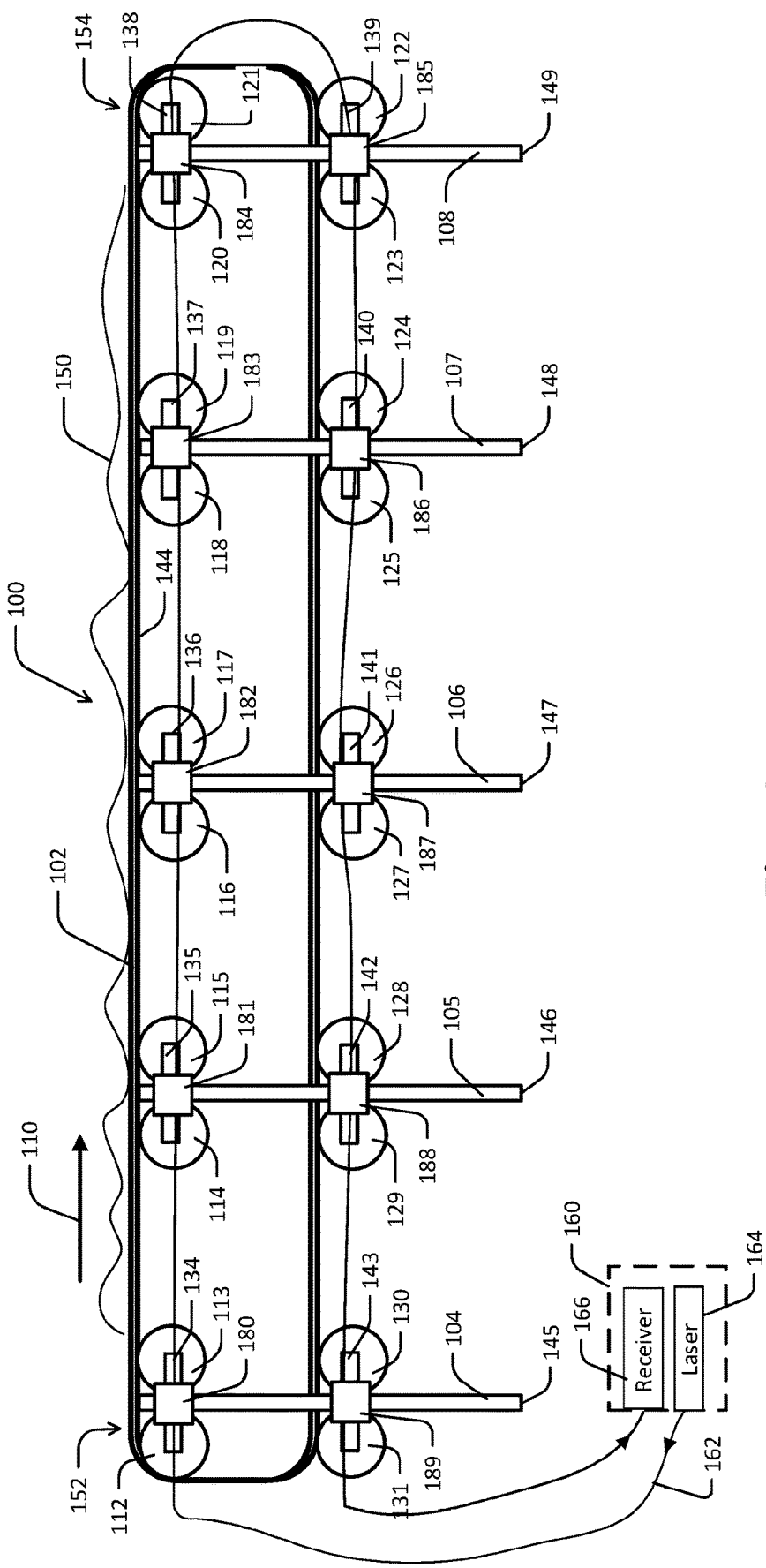
FIG. 1 is a schematic side view of a conveyor system having a plurality of rollers for driving linear movement of a conveyor belt.

Referring initially to FIG. 1, there is illustrated a conveyor system 100 representing a distributed system of spaced apart vibration sources. System 100 includes a substantially horizontally planar flexible conveyor belt 102 which is supportively maintained by a support structure including a plurality of spaced apart vertically extending support members 104-108. Lower ends 145-149 of support members 104-108 are embedded within the ground or foundations to maintain system 100 in a stable position during operation.

Conveyor belt 102 is conveyed in a forward direction of arrow 110 by a system of rollers 112-131. The rollers 112-131 are rotatably mounted in pairs to respective laterally extending rocker arms 134-143 and positioned to engage with an internal surface 144 of conveyor belt 102. Rocker arms 134-143 are, in turn, fixedly mounted to respective support members 104-108. Although only a limited number of rollers are illustrated, system 100 may extend many kilometres in length and have thousands of support members and rollers.

Rollers 112-131 are divided into forward rollers 112-121 for driving an upper region of conveyor belt 102 in the forward direction along an operative path and return rollers 122-131 for driving a lower region of conveyor belt 102 in a return direction along a lower return path. At least some of rollers 112-131 are actively rotatably driven by motors (not shown) while others may be passive rollers for supporting conveyor belt 102.

In operation, system 100 is adapted to transfer bulk materials 150 such as coal or iron ore long distances from a loading point 152 (such as a mining site) to an unloading point 154 (such as a bulk materials distribution site).

A vibration sensing system 160 is provided to monitor the vibrations in system 100. System 160 includes a length of optical fibre 162 that is positioned to extend alongside all of rollers 112-131. By way of example, optical fibre 16 may be a HAWK-4020-CABLE, which is a robust 6 core tight buffered single mode fibre optic cable that is UV stabilised and suitable for outdoor use. Fibre 162 is connected at one end to a laser 164, which transmits optical signals along the fibre 162, and to a signal receiver 166 for receiving optical signals transmitted along fibre 162. By way of example, laser may be an infrared laser having a central output wavelength of 1,550 nm and modulated to emit a pulsed output. Receiver 164 also includes a signal processor for processing the received optical signals to derive acoustic information about the state of wear of rollers 112-131 in system 100.

A number of vibration sensing systems are available commercially, such as the "Praetorian" system developed by Hawk Measurement Systems Pty Ltd. This system utilises a single-pulse direct detection coherent optical time domain reflectometry (C-OTDR) interrogator, which measures local variations in Rayleigh backscatter intensity in optical fibres due to dynamic strain changes along the fibre axis caused by external acoustic disturbances or vibration patterns.

In operation, the fibre 162 is interrogated using high intensity, short duration optical pulses transmitted from laser 164. As they propagate along fibre 162, the pulses are modulated by the acoustic vibrations induced in the fibre and an acoustic vibration signature can be extracted from the modulated signal. This vibration signature is subsequently processed by receiver 162 to extract information on roller wear conditions.

By transmitting multiple wavelength channels along fibre 162, distance bins along the fibre 162 can be defined which allow separation of vibration signals originating from different rollers. However, to sense vibrations of specific rollers, fibre 162 must be mounted proximal to the rollers and preferably connected to a path in which vibrations are transmitted.

In order for fibre 162 to be mounted proximal to the rollers, optical fibre mounting structures 180-189 are mounted to support members 104-108. Mounting structures 180-189 supportively engage optical fibre 162 in an operable position as described below.

Mounting Structure

With reference now to FIGS. 2 to 6, the features of optical fibre mounting structure 180 will be described. Mounting structures 181-189 have identical features to structure 160 and thus the following description applies equally to those devices.

Figure 2:
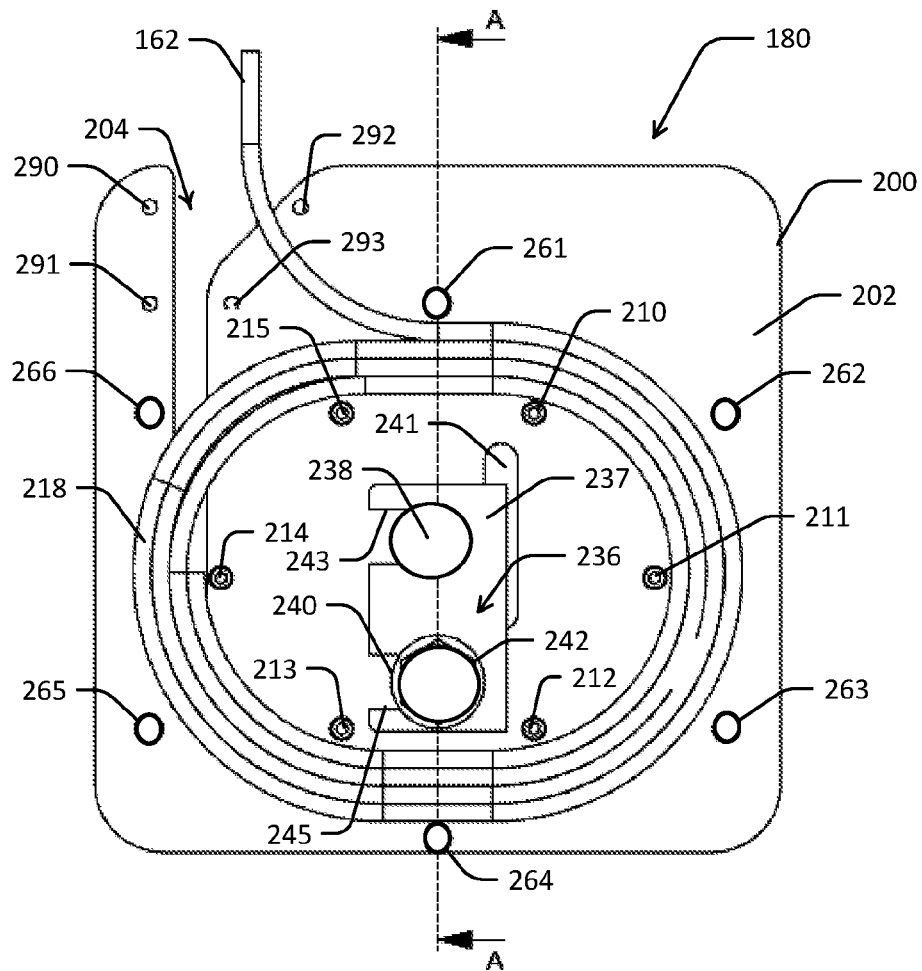
FIG. 2 is a front view of a mounting structure for supporting an optical fibre of a vibration sensing system for sensing vibrations in the conveyor system of FIG. 1.

Mounting structure 180 includes a base portion 200 having a two dimensional surface area defining a vibration surface 202, as best illustrated in FIG. 2. In the illustrated embodiments, base portion 200 includes a substantially planar structure in the form of a rectilinear plate having a receiving slot 204 defined therein for receiving fibre 162. Base portion 200 is preferably formed of metal or metal alloy such as steel through an extrusion or other conventional manufacturing process. Exemplary dimensions of base portion 200 are 250 mm by 250 mm with a thickness of about 3 mm. However, it will be appreciated that the dimensions may vary significantly among different designs and applications. In other embodiments, base portion 200 may include other substantially planar surfaces such as a circular or oval shaped disk, square, rectangle, rhombus or rhomboid, trapezium or other geometric shape. In further embodiments, base portion 200 may include other curved or contoured surfaces. Various other embodiments are described below.

Mounting structure 180 includes a fibre engagement structure for supportively engaging a length 218 of optical fibre 162 in contact with vibration surface 202. In the illustrated embodiment, the fibre engagement structure includes a plurality of guide apertures 210-215 disposed in base portion 200 at locations substantially around a loop structure. As illustrated best in FIG. 3, guide apertures 210-215 are adapted for receiving respective guide bolts 220-225. Guide bolts 220-225 are releasably engagable with base portion 200 through secure engagement with corresponding guide nuts 227-232 and associated washer arrangements.

Figure 3:
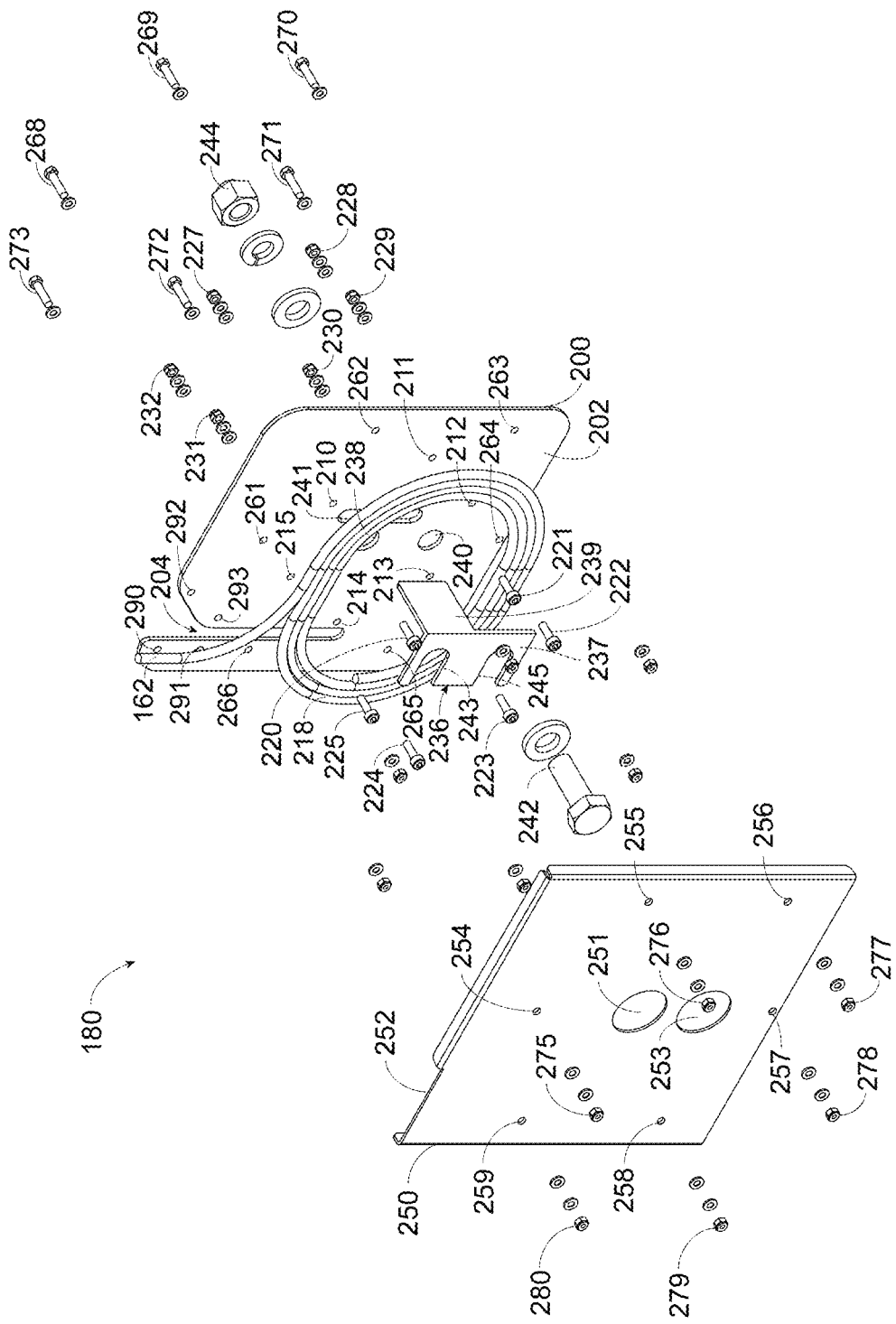
FIG. 3 is an exploded view of the mounting structure of FIG. 2.

In the illustrated embodiments, length 218 of optical fibre 162 is wound around the guide bolts 220-225 in the manner illustrated in FIGS. 2 and 3. Advantageously, optical fibre 162 may be wound around guide bolts 220-225 in a concentric manner to define a plurality of loops of increasing radius. This arrangement helps to increase the length of optical fibre that is in direct engagement with vibration surface 202, which increases the signal to noise ratio of vibration signals. It will be appreciated that guide bolts 220-225 may be disposed in formations other than a loop structure as illustrated. In other embodiments, the fibre engagement structure may include fixed bolts or other projections which extend outwardly from vibration surface 202 of base portion 200.

In further embodiments, alternative or additional fibre engagement structures may be used such as grooves etched into vibration surface 202, or flanges, rims, collars or ribs extending from vibration surface 202. In some embodiments, the length 218 of optical fibre 162 may be engaged to vibration surface 202 by way of an adhesive tape or one or more cable ties. The primary function of the fibre engagement structure is to ensure that a length of fibre is engaged with vibration surface 202.

Figure 4:
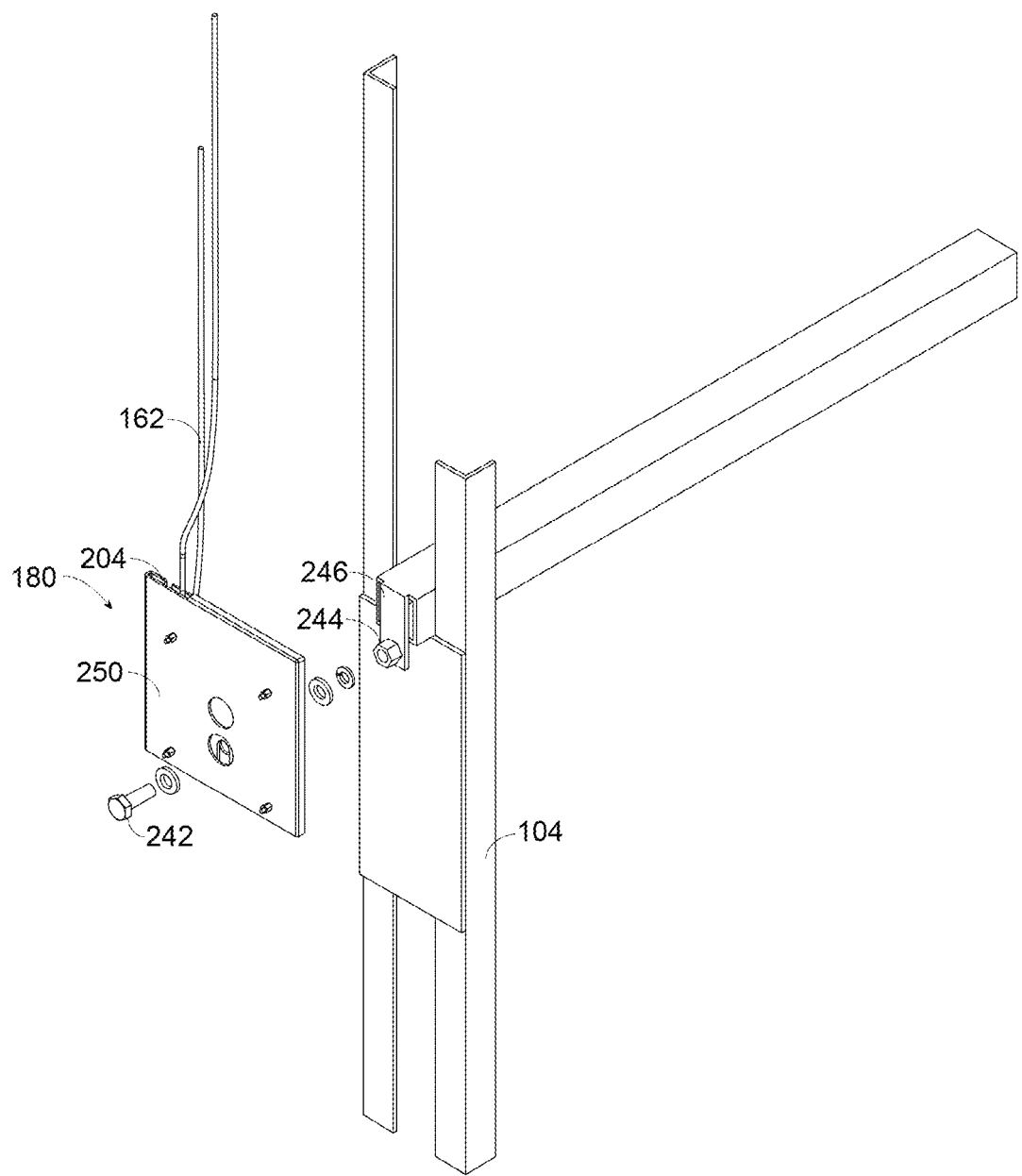
FIG. 4 is a perspective view of the mounting structure of FIG. 2 in the process of being mounted to a support member of a conveyor system.

As best shown in FIGS. 2 to 4, a mounting apparatus 236 is provided for mounting base portion 200 to support member 104 of system 100 adjacent the rollers. Mounting apparatus 236 includes a pair of apertures 238 and 240, each of which is adapted to receive a bolt 242. Bolt 242 is selectively engagable with a corresponding nut 244 to a corresponding mounting formation 246 of support member 104. Mounting formation 246 is preferably formed of metal or metal alloy such as steel through an extrusion or other conventional manufacturing process. The two positions of apertures 238 and 240 provide alternative options for securing mounting structure 180 to support member 104. However, in some embodiments, mounting structure 180 may be secured to support member 104 using two bolts inserted through both apertures 238 and 240.

Mounting apparatus 236 further includes a spacer element 237 having a flange 239 for insertion though a guide slot 241 in base portion 200. Spacer includes a pair of guide grooves 243 and 245 for receiving bolt 238 in either aperture 238 or 240. Like base portion 200, spacer element 237 is preferably formed of metal or metal alloy such as steel through an extrusion or other conventional manufacturing process.

As illustrated in FIG. 1, mounting structures are mounted at an upper location adjacent the forward rollers and a lower location adjacent the return rollers on each support member.

Referring now to FIGS. 3 to 6, a cover portion 250 is provided which is able to be engaged with base portion 200 to securely engage the length 218 of optical fibre 162. Cover portion 250 is substantially in the form of a plate and includes a two dimensional mating surface 252 which, when engaged, opposes vibration surface 202 in a manner described below. As illustrated, cover portion 230 is substantially rectilinear and like in shape with base portion 200 except that cover portion 250 does not include slot 204. Although cover portion 250 is illustrated as having similar shape and dimensions to base portion 200, it will be appreciated that this need not be the case and cover portion 250 may comprise other shapes and have different dimensions to that of base portion 200. Like base portion 200, cover portion 250 is preferably formed of metal or metal alloy such as steel through an extrusion or other conventional manufacturing process.

As illustrated best in FIG. 3, bolt 242 is able to secure base portion 200 to support member 104 independently of cover portion 250. This is achieved by apertures 251 and 253 disposed in cover portion 250 which have diameters greater than that of bolt 242. In this manner, cover portion 250 can be engaged with base portion 200 after mounting to support member 104. In this regard, cover is optional and, in some embodiments, mounting structure 180 does not include cover portion 250.

To secure cover portion 250 to base portion 200 and bring them into clamping engagement, cover portion 250 includes one or more securing formations, which may take a number of forms. In the illustrated embodiment, the securing formations take the form of a plurality of securing apertures 254-259 disposed in cover portion 250. Base portion 200 also includes a plurality of securing apertures 261-266. Securing apertures 254-259 in cover portion 250 and securing apertures 261-266 of base portion 200 are disposed at corresponding like locations such that, when cover portion 250 and base portion 200 are brought into clamping engagement, respective ones of the apertures are axially aligned. This allows the aligned apertures to collectively receive respective securing bolts 268-273 for securing cover portion 250 to base portion 200. Bolts 268-273 are secured by engaging with corresponding nuts 275-280 and associated washer assemblies, as best illustrated in FIG. 3. The base portion 200 and cover portion 250 are best illustrated in clamping engagement in FIG. 6.

Securing apertures 254-259 and 261-266 are disposed on the respective portions substantially around a loop structure that surrounds the loop defined by guide apertures 210-215. However, it will be appreciated that the securing apertures may be distributed in other patterns or fewer or greater apertures may be used.

In other embodiments (not illustrated), the securing formations take the form of one or more securing bolts integrally formed in base portion 200 and projecting outwardly therefrom. The integral bolts are positioned at locations such that, when cover portion 250 and base portion 200 are brought into clamping engagement, respective ones of the bolts are received in corresponding ones of securing apertures 254-259. These integrally formed bolts are preferably located at the same locations as securing apertures 261-266 but other distributions are possible provided the distribution of apertures 254-259 match the distribution of bolts.

Similarly, in further embodiments, the securing formations take the form of one or more securing bolts integrally formed in cover portion 250 and projecting outwardly therefrom. The integral bolts are positioned at locations such that, when cover portion 250 and base portion 200 are brought into clamping engagement, respective ones of the bolts are received in corresponding ones of apertures 261-266 disposed in base portion 200.

In still further embodiments, the securing formations may take other forms such as one or more hinged clamps and/or vice clamps having flanges which engage inwardly mutually engage base portion 200 and cover portion 250 in clamping engagement.

In other embodiments, bolt 242 acts as a securing formation. In these embodiments, apertures 251 and 253 have diameters of sufficient diameter such that the head of bolt 242 engages with cover portion 250 during fastening. In this manner, bolt 242 extends through both base portion 200 and cover portion 250 and is able to bring base portion 200 and cover portion 250 into clamping engagement to support the length of optical fibre. In these embodiments, securing apertures 254-259 and 261-266, bolts 268-273 and nuts 275-280 may not be required.

In further embodiments, cover portion 250 engages with base portion 200 through magnetic force by one or more magnets or magnetic regions. Where cover portion 250 and/or base portion 200 are formed of a ferrous material such as steel, one or more magnets may be mounted on cover portion 250 and/or base portion 200 and positioned to magnetically engage with the opposing portion. Where neither cover portion 250 nor base portion 200 are formed of ferrous materials, magnets may be mounted on both portions at corresponding like locations such that they mutually magnetically engage when cover portion 250 is brought into close proximity to base portion 200. In some embodiments, one or both of base portion 200 and cover portion 250 may themselves be magnetised, or a portion thereof, to provide magnetic force.

More broadly, it will be appreciated that any means for engaging cover portion 250 with base portion 200 may be implemented.

With reference to FIGS. 3 to 6, in operation, guide bolts 220-225 are first secured to base portion 200 by rotatably engaging the bolts with respective ones of nuts 227-232 and associated washers. With bolts 220-225 secured, they project outwardly from base portion 200 providing guides for optical fibre 162. Next, length 218 of optical fibre 162 is looped around guide bolts 220-225 in the manner illustrated in FIGS. 2 and 3. Fibre 162 is looped with sufficient tension such that it is maintained on bolts 220-225 without external force. The length of fibre 162 to loop around guide bolts 220-225 is preferably sufficiently long such that vibrations of the adjacent rollers are significantly enhanced. Typically, the greater the length of fibre that is held in contact with vibration surface 202, the greater the enhancement of vibrations will be. By way of example length 213 may be in the range of 0.5 m to 5 m. However, it will be appreciated that length 213 is dependent on the particular applications and for larger applications such as turbines, length 213 may be larger than 5 m.

Figure 5:
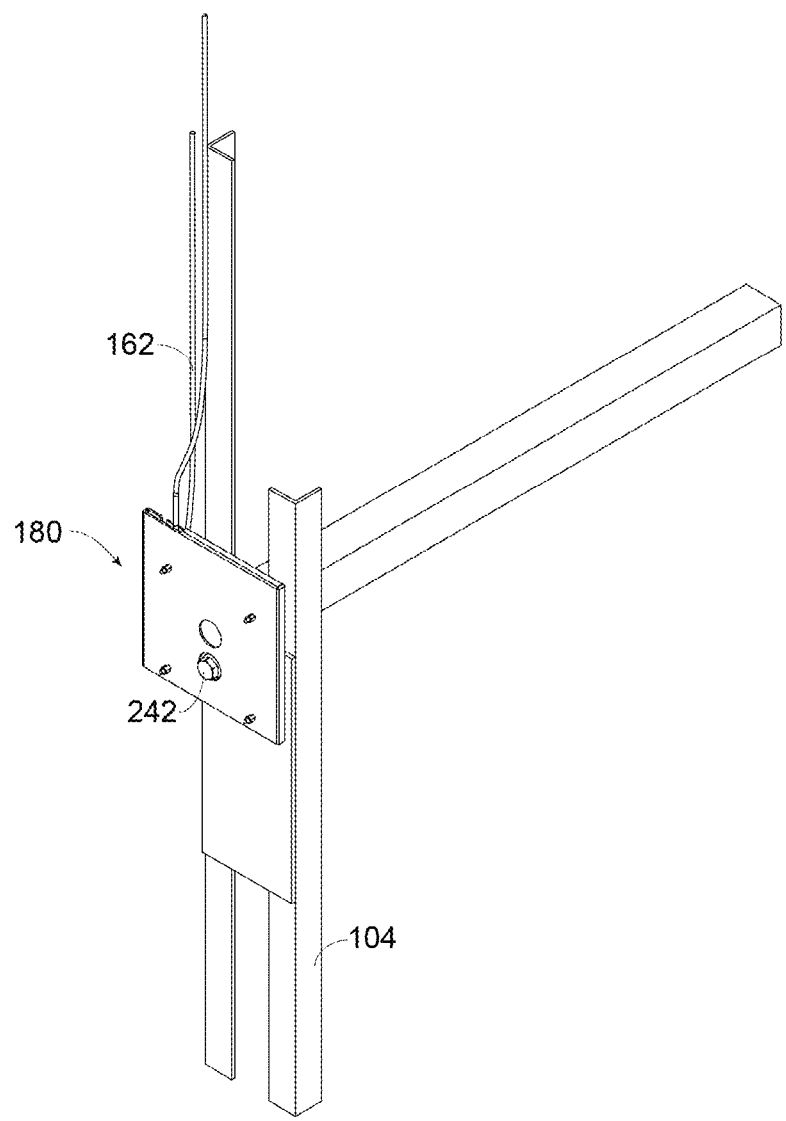
FIG. 5 is a perspective view of the mounting structure of FIG. 2 mounted to a support member of a conveyor system.

As best illustrated in FIGS. 4 and 5, both a beginning and an end of length 218 of fibre 162 is received in slot 204 such that optical fibre 162 can be looped through a plurality of mounting structures along the length of the conveyor system. And that additional guide means can be used at the entrance apertures. Referring to FIG. 1, additional guide apertures 290-293 are provided for optionally containing optical fibre 162 in slot 204 using cable ties or other restraining means.

Figure 6:
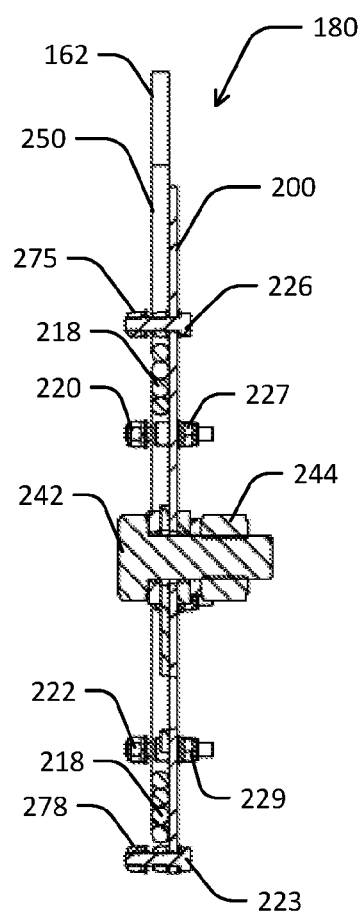
FIG. 6 is a side view of the mounting structure of FIG. 2.

With length 218 of fibre 162 supportively engaged in contact with vibration surface 202, cover portion 250 can now be installed. As mentioned, above, cover portion 250 is optional and may be omitted. To install cover portion 250, it is placed against base portion 200 with vibration surface 202 opposing mating surface 252. With the portions held in place, securing bolts 268-273 are inserted through respective ones of securing apertures 261-266 of base portion 200, through respective ones of securing apertures 254-259 of cover portion 250 and rotatably engaged with corresponding securing nuts 275-280. Upon securing respective nuts 275-280 with bolts 268-273, cover portion 250 is brought into clamping engagement with base portion 200. Length 218 of optical fibre 162 is now supported in contact with both mating surface 252 and vibration surface 202 as best illustrated in FIG. 6.

With length 218 of fibre 162 supported in place against vibration surface 202, mounting structure 180 can be mounted to support member 104.

To mount structure 180 to support member 104, base portion 200 is first placed against mounting formation 246 of support member 104. Mounting formation 246 is pre-installed at a location adjacent a pair of rollers which are to be monitored. Spacer element 237 is inserted through guide slot 241 and bolt 242 is then inserted through aperture 240 (or aperture 238). Bolt 242 is threaded through nut 244 and associated washers as illustrated in FIG. 4. Nut 244 may be mounted to mounting formation 246 or located on an opposite side to which mounting structure 180 is to be mounted. In either case, bolt 242 is rotatably engaged with nut 244 to secure mounting structure 180 to support member 104. In some embodiments, mounting formation 246 includes a projecting screw or bolt that is inserted through aperture 240 (or aperture 238) to be engaged with a corresponding bolt to secure structure 180 to support member 104. With structure 180 mounted to support member 104, vibrational signatures of the adjacent rollers are efficiently transferred through to vibration surface 202 and efficiently received by length 218 of optical fibre 162. In some embodiments, isolation is provided between plates of adjacent forward and return rollers (e.g. between upper roller pair 112/113 and lower roller pair 130/131). This isolation may be provided by inserting foam rubber or other vibratory insulating material along a cable tray between the roller pairs. This isolation can help reduce cross-talk between vibrational signatures of the two closely located roller pairs and therefore improve the signal to noise ratio of a detected vibration signal.

The mounting structure described herein allows a significant length of optical fibre to be maintained in contact with the large surface area of a vibration surface such that vibration signals are significantly enhanced over prior art systems. Efficient sensing of vibration signals improves the signal to noise ratio of the vibration sensing system and allows clearer information about the state of wear of rollers to be obtained.

By using the mounting structure described herein, roller characteristics such as volumetric loading on the conveyor, shifting of the conveyor in misalignment, idler performance, temperature change and idler vibrational outcomes are more easily determined. These sensed characteristics can be used as an indication of future failure and allow automated control or replacement of idlers deemed to be faulty or determined to become faulty such that programmed maintenance or alarms can be generated to minimise down time and loss of productivity.

Other Embodiments

A number of alternative embodiments are possible which provide at least some of the advantages described above and may provide alternative advantages. These alternative embodiments are summarised below.

Figure 7:
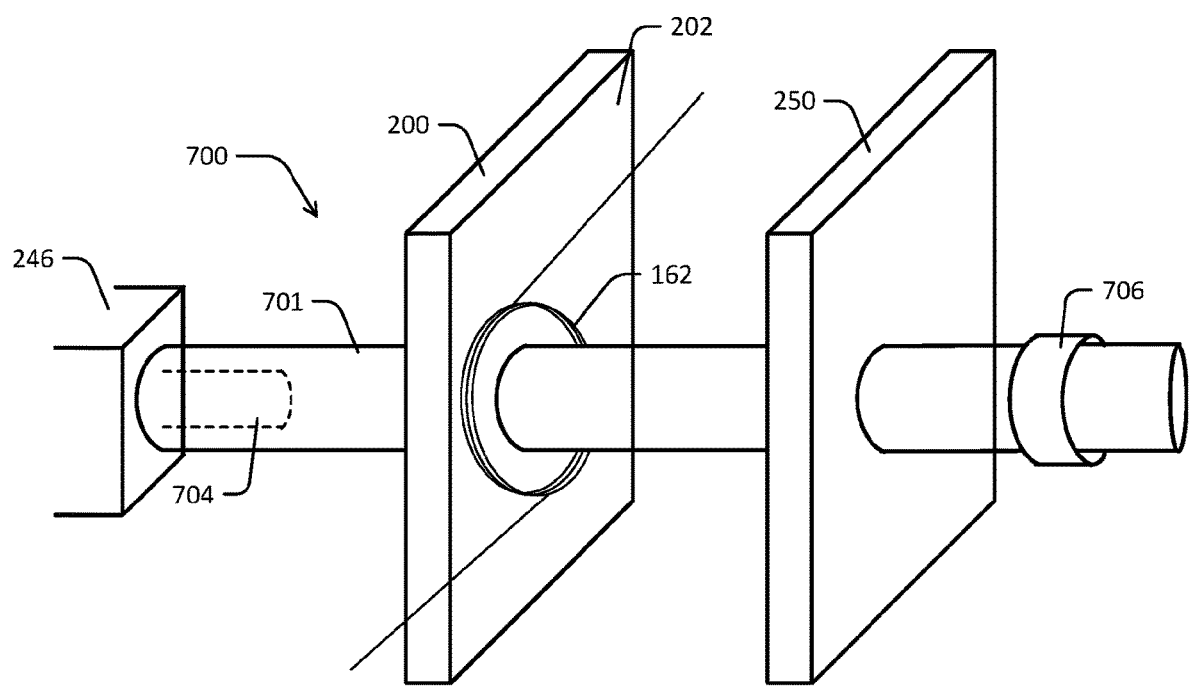
FIG. 7 is a side perspective view of a second embodiment mounting structure.

In one alternative embodiment mounting structure 700, illustrated in FIG. 7, mounting apparatus 236 includes an elongate mounting rod 701 that is mounted at one end to mounting formation 246 of support member 104. The elongate mounting rod projects through one of apertures 238 or 240 of base 200 and apertures 251 or 253 of cover 250 to supportively receive base portion 200 and cover portion 250. By way of example, mounting rod 701 may include an internal screw thread (not shown) which engages with a corresponding screw 704 projecting from mounting formation 246.

This embodiment significantly simplifies the arrangement over that of FIGS. 2-6 in that securing bolt 242, guide apertures 210-215, guide bolts 220-225, guide nuts 227-232, securing apertures 254-259, securing apertures 261-266, securing bolts 268-273, securing nuts 275-280 and related components are not required. This simplification may lead to lower costs.

To install mounting structure 700, the internal screw thread of mounting rod 701 is rotatably engaged with screw 704 to secure mounting rod 701 to mounting formation 246. With mounting rod 701 in place, base portion 200 is sleeved over the rod and moved to a desired longitudinal location along rod 701. Length 162 of optical fibre is then looped around rod 701 in contact with base portion 200. The diameter of rod 701 should be sufficiently large such that bending losses in the optical fibre are contained to an acceptable level. Length 162 of optical fibre may be looped concentrically against base portion 200 as described above. In some embodiments, base portion 200 may include guide formations or other fibre engagement structures described above to increase the length of optical fibre in direct contact with rod 701 and base portion 200. Length 162 may also be looped concentrically along a length of rod 701.

After length of optical fibre 162 is wound, cover portion 250 is sleeved over mounting rod 701 and brought into engagement or close proximity to base portion 200 to lock length 162 in place. Finally, base portion 200 and cover portion 250 may be slideably brought into clamping engagement by one or more clamping collars 706, which slideably engage with mounting rod 701 to abut base 200 and/or cover 250. Clamping collar 706 includes means for radially engaging with rod 701 and may include a spring collar or a material of resilient bias (e.g. rubber band).

In mounting structure 700, the surface of base portion 200, mounting rod 701 and cover portion 250 may individually or collectively form the vibration surface for transmitting vibrations to the optical fibre. In some embodiments, mounting rod 701 includes and external helical screw thread extending wholly or partially longitudinally along its length. This screw thread enables engagement with base portion 200 and cover portion 250 and clamping collar 706, where the respective apertures of each element have corresponding screw threads. This provides the additional advantage of the optical fibre being able to be wound around mounting rod 701 within the grooves of the screw thread to increase the surface area contact between length 162 and rod 701.

Figure 8A:
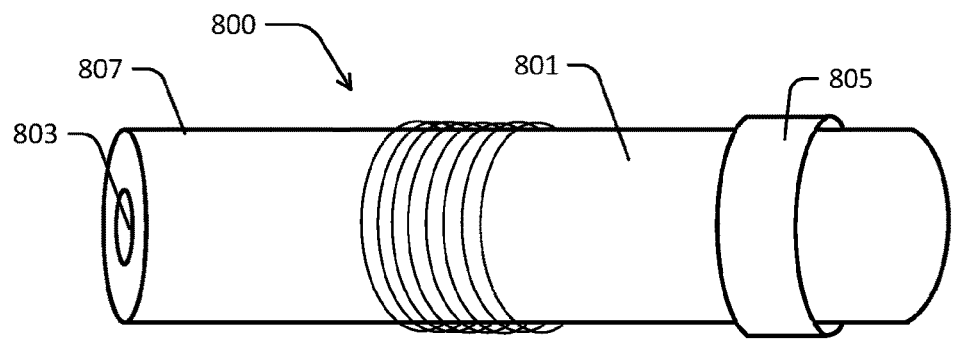
FIG. 8A is a side view of a third embodiment mounting structure.
Figure 8B:
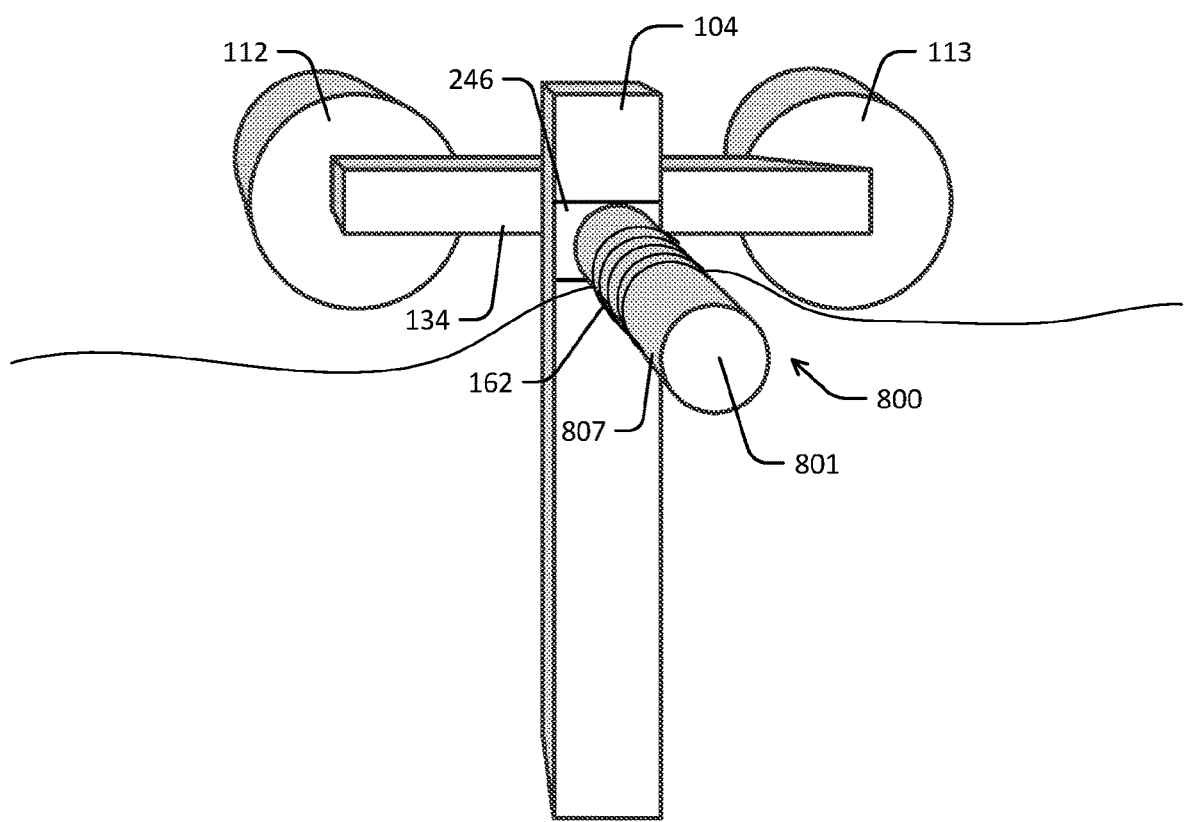
FIG. 8B is a front perspective view of the third embodiment mounting structure mounted to a support of a conveyor system.

Referring now to FIG. 8, there is illustrated a further simplified mounting structure 800 that is similar to that of mounting structure 700. Mounting structure 800 includes a mounting rod 801 that is engagable with mounting formation 246 of support 104 by way of an internal screw thread 803, as illustrated in FIG. 8A. However, rod 801 may alternatively include projecting a screw which engages with a complementary aperture of mounting formation 246 or other similar engagement means.

As shown in FIG. 8A, a clamping collar 805, such as a spring clamp or rubber band may be sleeved onto mounting rod 801 to restrict longitudinal movement of length 162 of fibre.

To install mounting structure 800, internal screw thread 803 is rotatably engaged with a corresponding screw (not shown) of mounting formation 246 to secure rod 801 with formation 246. With mounting rod 801 in place, length 162 of optical fibre is then looped around rod 801 in a concentric manner as illustrated. Clamping collar 805 is then sleeved onto rod 801 to secure length 162 in place.

In operation, rod 801 acts as the base portion and an outer surface 807 of rod 801 forms the vibration surface for transmitting vibrations to length 162. In some embodiments, mounting rod 801 includes a longitudinally extending helical screw thread formed in outer surface 807, which operates as a fibre engagement structure. The screw thread includes a continuous groove in which length 162 of optical fibre may be situated to increase the surface area of rod 801 in contact with the fibre. Referring to FIG. 9, there is illustrated a further embodiment mounting structure 900. Here, mounting structure 900 is formed of an elongate hyperboloid structure 901 having a central waist 903 of narrow diameter and two end regions 905 and 907 of larger diameter than waist 903. Hyperboloid structure 901 is engaged with mounting formation 246 by way of an internal screw thread 909 that engages a complementary screw (not shown).

Figure 9A:
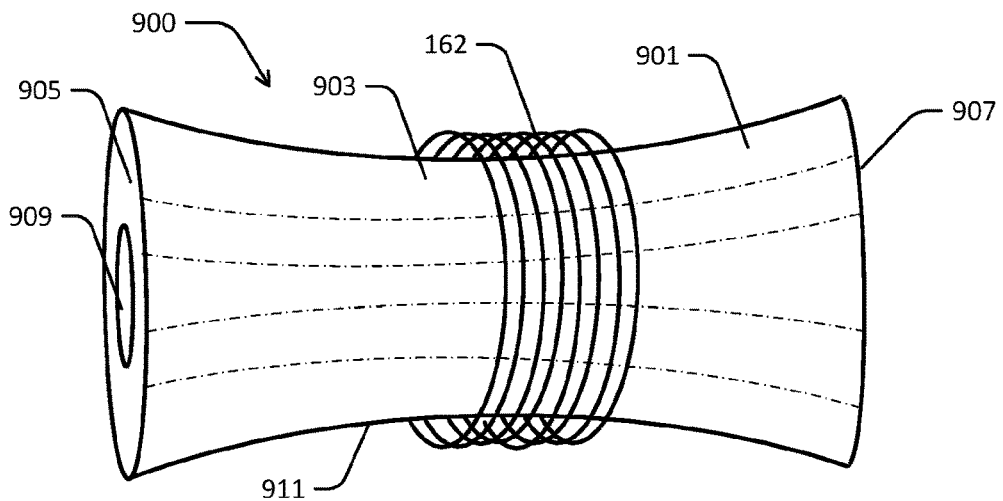
FIG. 9A is a side view of a fourth embodiment mounting structure.
Figure 9B:
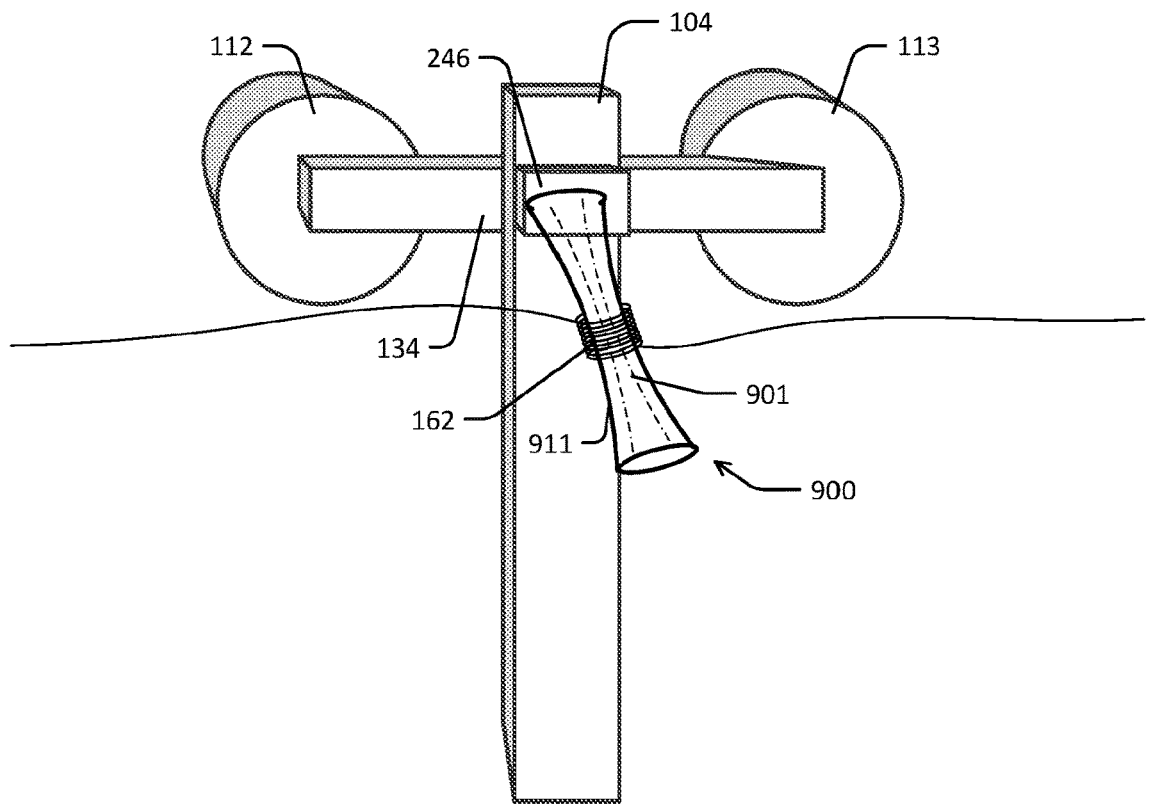
FIG. 9B is a front perspective view of the fourth embodiment mounting structure mounted to a support of a conveyor system.

In operation, length 162 of optical fibre is wound concentrically around waist 903 of structure 901 as illustrated best in FIG. 9A. The diverging diameter of structure 901 serves to hold length 162 of optical fibre in place while an outer surface 911 of structure 901 acts as the vibration surface to transfer vibrations to the fibre.

Figure 10:
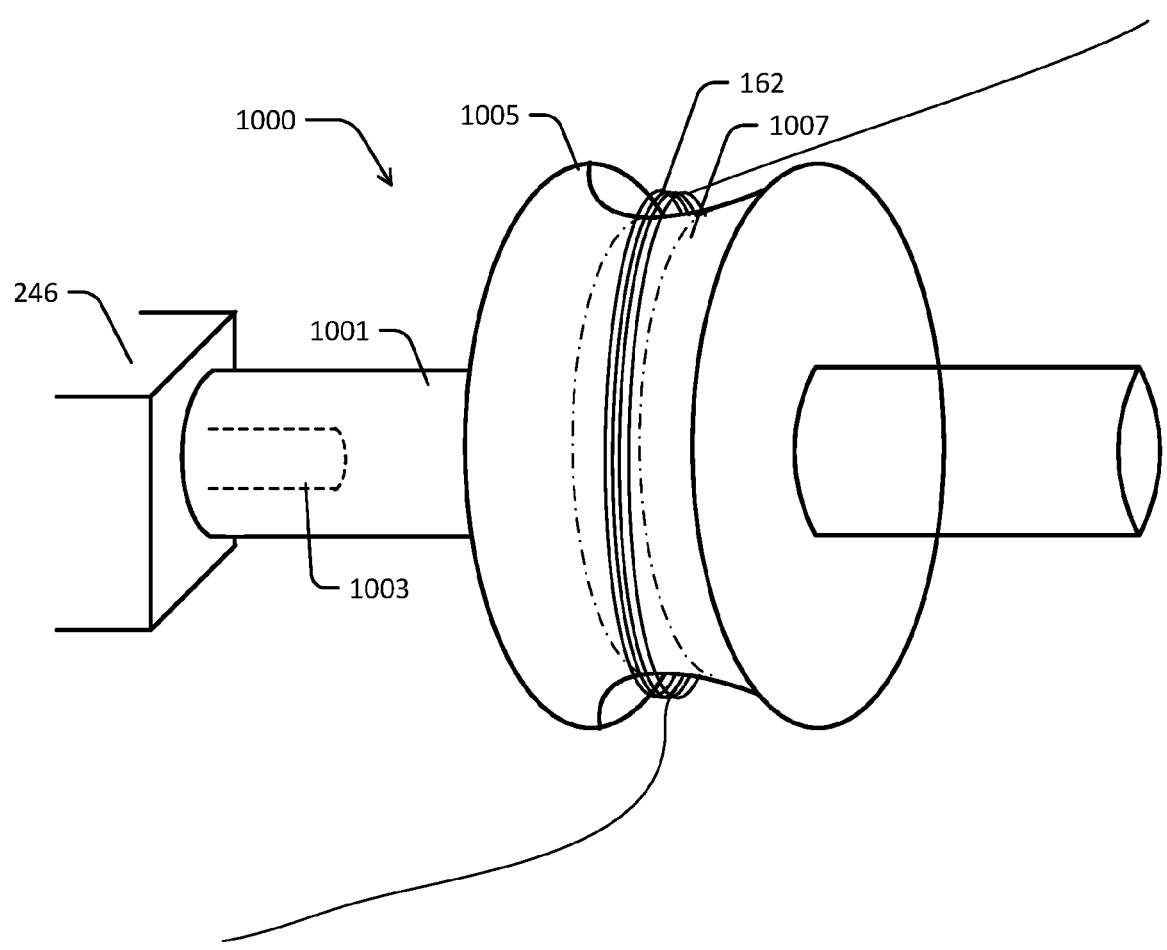
FIG. 10 is a side view of a fifth embodiment mounting structure.

Referring to FIG. 10, there is illustrated a further embodiment mounting structure 1000. Mounting structure 1000 includes a mounting rod 1001 that is engagable with mounting formation 246 via an internal screw thread (not shown) which engages with a corresponding screw 1003 projecting from mounting formation 246. However, rod 1001 may alternatively include projecting a screw which engages with a complementary aperture of mounting formation 246 or other similar engagement means.

Mounting structure 1000 also includes a pulley wheel 1005 which is mounted to rod 1001 at a position intermediate its two ends. Wheel 1005 includes a central circumferentially extending depression or groove 1007 in which length 162 of optical fibre is wound. Wheel 1005 may be fixedly mounted to rod 1001 or may be slideable along rod 1001 and secured by a separate clamping collar (not shown) such as those described above.

In operation, mounting rod 1001 and wheel 1005 act as a base portion and the central groove 1007 of wheel 1005 forms vibration surface which transfers vibrations to length 162 of optical fibre.

Referring to FIG. 11, there is illustrated a further embodiment mounting structure 1100. Structure 1100 is configured to be used in a conveyor system such as a dual sided, large standard configuration trough conveyor belt system 1200 illustrated in FIG. 12. In system 1200, rollers 1201-1203 are forward rollers for moving conveyor belt 1205 in a forward direction to carry material 1207 such as coal. Rollers 1209 and 1210 are return rollers for returning the conveyor belt 1205.

Figure 11A:
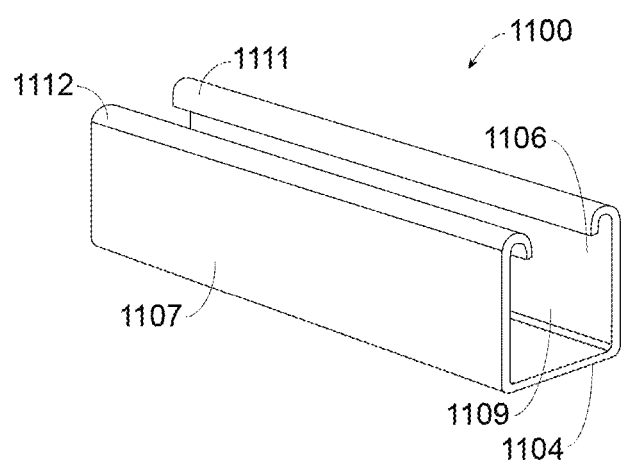
FIG. 11A is a side perspective view of a fifth embodiment mounting structure.
Figure 11B:
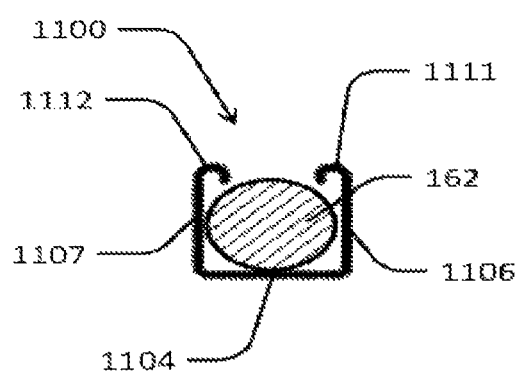
FIG. 11B is a cross section of the fifth embodiment mounting structure.

Mounting structure 1100 includes an elongate 'U' shaped channel member 1102 formed of a rigid material such as aluminium or other metal. Channel member 1102 includes a substantially planar base 1104 and a pair of substantially planar and parallel extending sidewalls 1106 and 1107. Sidewalls 1106 and 1107 extend substantially perpendicularly from both sides of base 1104 as illustrated in FIGS. 11A and 11B. In other embodiments, sidewalls 1106 and 1107 extend at non-perpendicular angles such as acute angles where the sidewalls extend toward each other or obtuse angles so as to define a 'V' shape cross section of channel member 1102.

Sidewalls 1106 and 1107 are preferably substantially like in length and have distal ends which are inwardly directed via bending/folding to form lips 1111 and 1112. The interior region defined by base 1104 and sidewalls 1106 and 1107 forms a channel 1109 in which an optical fibre 162 can be situated and the structure can be installed on a vibration system such as system 1200 as described below.

In some embodiments, base 1104 and sidewalls 1106 and 1107 are formed of a single material that is bent or moulded into a U shape or similar during manufacture. In other embodiments, base 1104 and sidewalls 1106 and 1107 are formed of separate pieces of material and subsequently welded or bonded together to form channel member 1102. In other embodiments, base 1104 and/or sidewalls 1106 and 1107 may be non-planar and include a curved, corrugated or stepped profile. In some embodiments, sidewalls 1106 and 1107 may have different lengths.

The material thickness of base 1104 and sidewalls may be chosen such that they have some flexibility and are resiliently biased into the substantially parallel position of FIG. 11, extending perpendicularly from base 1104. This flexibility allows optical fibre 162 to be inserted into channel 1109 by applying downward pressure to the fibre onto lips 1111 and 1112 to urge sidewalls 1106 and 1107 slightly apart. Upon sufficient separation, optical fibre 162 can be pushed into channel 1109 and the sidewalls return to their upright position with the lips 1111 and 1112 restricting optical fibre 162 from being able to leave channel 1109. In embodiments wherein sidewalls 1106 and 1107 extend at acute angles from base 1104 towards each other, lips 1111 and 1112 may not be required as the sidewalls may be resiliently biased into a position so as to substantially enclose the optical fibre 162 in channel 1109.

In some embodiments, the dimensions of channel member 1102, such as the width of base 1104, may be matched or closely matched to the diameter of the optical fibre 162 such that, when situated in channel 1109, optical fibre 162 is in contact with base 1104 and sidewalls 1106 and 1107. This is illustrated in FIG. 11. In this situation, surface contact between optical fibre 162 and channel member 1102 is increased to provide enhanced transfer of vibrations to fibre 162. In one embodiment, base 1104 and sidewalls 1106 and 1107 both have dimensions of about 10 mm to form a channel structure that is about 10 mm by 10 mm in cross section.

With optical fibre 162 in position in channel 1109, the inner surface of base 1104 defines, at least in part, the vibration surface which transfers vibrations from the surrounding system 1200 to the optical fibre. In the case where sidewalls 1106 and 1107 also contact optical fibre 162, inner surfaces of the sidewalls may also partially define the vibration surface. Sidewalls 1106 and 1107 define, at least in part, the fibre engagement structure. The fibre engagement structure may also be defined in part by base 1104 and lips 1111 and 1112.

In other embodiments (not illustrated), particularly where the dimensions of channel member 1102 are larger than a diameter of the optical fibre 162, optical fibre 162 may only contact base 1104 of channel member 1102 or base 1104 and a single sidewall. To assist in maintaining optical fibre 162 in contact with base 1104 and/or sidewalls 1106 and 1107, an insert such as a non-hardening foam material may be added into channel 1109. This insert material preferably has a working temperature of −73° C. to 260° C. and is suitable for any terrestrial environment. It is preferably resistant to humidity and water ingress (<5% by weight over its lifetime) and as its specifications are preferably relatively static over the expected installation life time (25 years). This insert may also define, in part, the fibre engagement structure.

Figure 12:
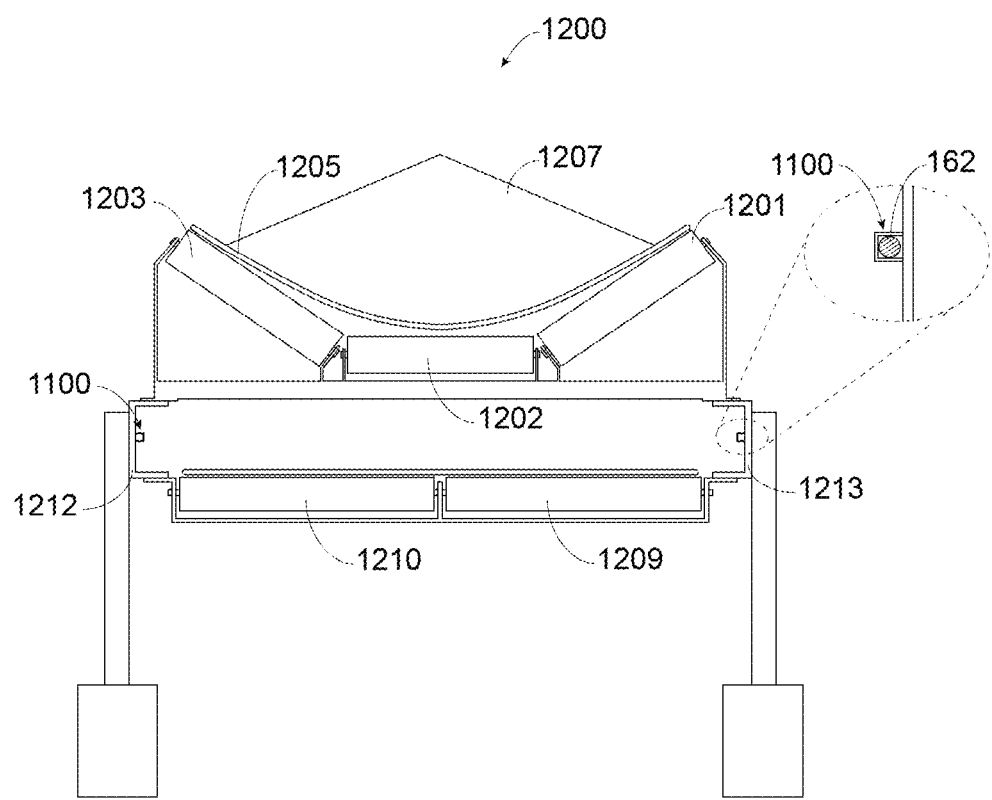
FIG. 12 is a front view of a dual sided, large standard configuration trough conveyor belt system.

As shown in FIG. 12, mounting structure 1100 is configured to be installed on a support beam such as 'C' shaped stringer elements 1212 and 1213 that are mounted substantially horizontally adjacent return rollers 1209 and 1210. Stringer elements 1212 and 1213 are horizontal support joists generally made from a rolled steel sheet metal purlin. This mounting location is advantageous as stringer elements 1212 and 1213 extend substantially horizontally along sections of the conveyor system adjacent the rollers and their rigid metal efficiently transfers vibrations from the adjacent rollers. As such, mounting structure 1100 to stringer elements 1212 and 1213 allows for efficiently coupling the vibration signatures of the adjacent rollers to the optical fibre 162 for sensing. However, it will be appreciated that, in other embodiments, mounting structure 1100 may be mounted to other parts of the support structure of system 1200.

Figure 13:
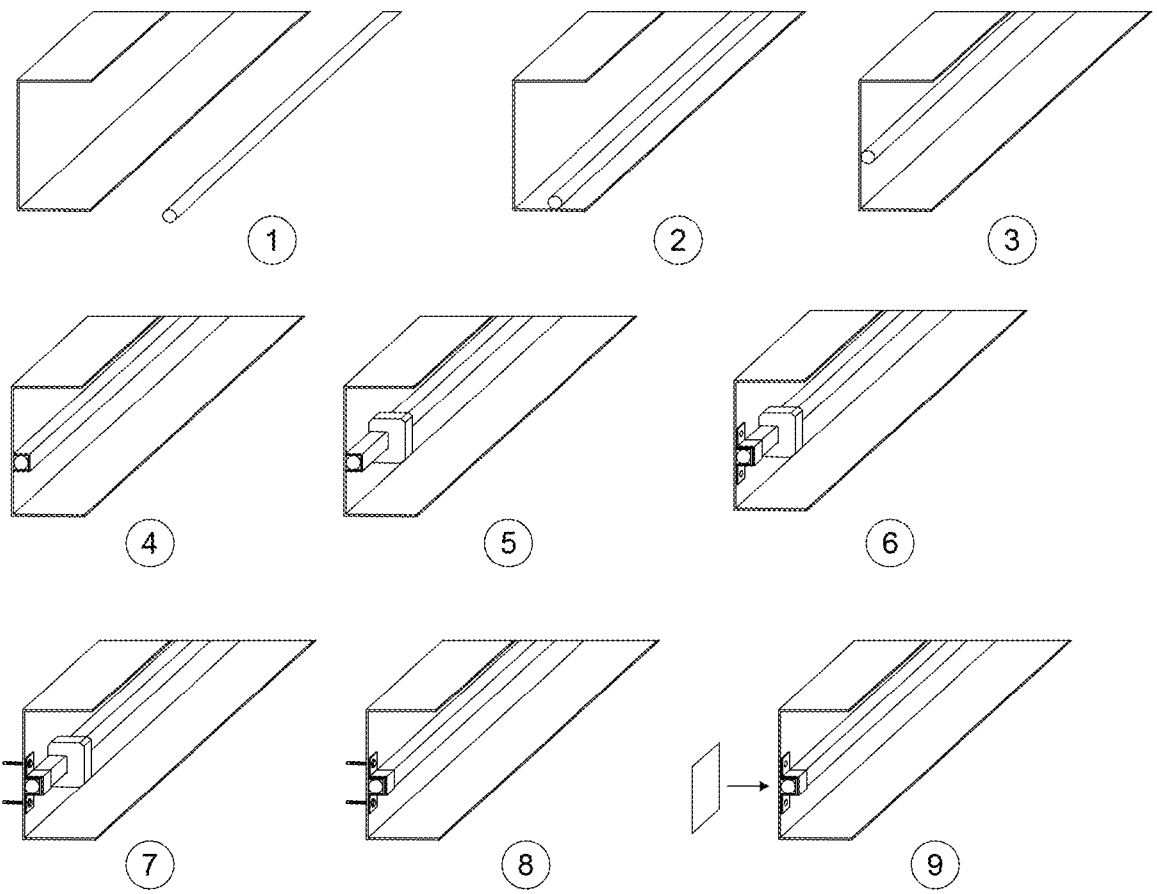
FIG. 13 is a series of panels illustrating a process of installing the fifth embodiment mounting structure to a support structure of a conveyor system.
Figure 13:
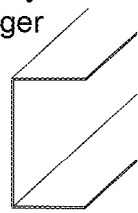
Figure 13:
Figure 13:
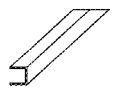
Figure 13:
Figure 13:
Figure 13:
Figure 13:

Referring now to FIG. 13, the process for installing optical fibre 162 and mounting structure 1100 will be described.

Initially, at panel 1 of FIG. 13, optical fibre 162 is pulled along the length of the return belt. At panel 2, optical fibre 162 is lifted in sections onto each stringer element's lower vertical surface where it is temporarily left in position. Next, at panel 3, the optical fibre 162 is raised to an installation position on a vertical wall of the stringer element. This may be, for example, about half way up the vertical wall of the stringer element for easy access by a technician. At panel 4, the channel member 1102 is installed on the outside of the optical fibre 162. The channel member 1102 may be formed into sections having individual lengths in the range of 200 mm to 2 m. Individual sections may be installed sequentially or in parallel with a team of installers.

At panel 5, U shaped magnetic clamps are installed to hold the channel member 1102 in place against the stringer member. These magnetic clamps have dimensions slightly larger than that of channel member 1102 so that they substantially surround the channel member with a snug or close fit. The magnetic clamps are used as temporary braces to hold the channel member in place prior to it being secured. One or more magnetic clips may be needed for each individual channel member section.

At panels 6 and 7, the temporarily secured channel member 1102 is then secured to the stringer member with one or more saddle clips or brackets and corresponding screws such as tek screws, which are driven into the stringer member. The saddle clips may be formed of a galvanised steel construction and have predrilled holes suitable for the supplied screws. The saddle clips have a substantially rectilinear contour with dimensions sized to compress the channel member 1102 against the stringer member. The saddle clips may be either a half saddle of full saddle configuration where the full saddle is preferable where allowed. Secure mounting of channel member 1102 is important to efficiently couple vibrations to the optical fibre 162.

The screws are preferably self-tapping screws capable of penetrating tapping and holding into up to 12 mm of steel with pull-out forces exceeding 10,000 Newtons. After the screws are used to secure the saddle clips, the magnetic clips may be removed.

At panel 8, the screws may be cut and ground flush to the stringer member surface.

Finally, at panel 9, an optional anti corrosion bitumen patch may be placed on stringer outer surface. This step may be performed in cases where corrosion of the ground off screw and surrounding metal is of a concern. The bitumen patch may be a 75 mm$^2$ bitumen backed aluminium patch that can be placed over the worked material. These may be provided in a size that is suitable for half or full saddles.

When secured in the installed location, channel member 1102 supports optical fibre 162 in close or direct contact with stringer elements 1212 and 1213 to facilitate efficient coupling of vibration signatures of the adjacent rollers 1201-1203 and 1209 and 1210. In some embodiments, the length of sidewalls 1106 and 1106 are defined to be slightly smaller than the diameter of optical fibre 162 such an upper portion of optical fibre 162 projects above the sidewalls and is held in direct contact with stringer elements 1212 and 1213. This can enhance the coupling of the roller vibration signals. It will be appreciated that the various embodiments described above all seek to increase the surface area of optical fibre in contact with a vibration surface of a mounting structure. This improves the signal to noise ratio of the vibration sensing system and allows clearer information about the state of wear of rollers to be obtained.

Interpretation

Unless specifically stated otherwise, as apparent from the following discussions, it is appreciated that throughout the specification discussions utilizing terms such as "processing," "computing," "calculating," "determining", analysing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Embodiments described herein are intended to cover portion any adaptations or variations of the present invention. Although the present invention has been described and explained in terms of particular exemplary embodiments, one skilled in the art will realize that additional embodiments can be readily envisioned that are within the scope of the present invention.

What is claimed is:

1. An optical fibre mounting structure for fibre vibration sensing of a distributed system of spaced apart vibration sources, the mounting structure including:
   a base portion having a substantially planar two dimensional surface area defining a vibration surface;
   a mounting apparatus adapted to mount the base portion to a support structure of the distributed system adjacent one of the vibration sources;
   a fibre engagement structure including one or more guide formations disposed at different locations on the base portion for supportively engaging a length of optical fibre in contact with the vibration surface.

2. The optical fibre mounting structure according to claim 1 wherein the guide formations include guide pins extending outwardly from different locations of the base portion.

3. The optical fibre mounting structure according to claim 1 wherein the guide formations include guide apertures disposed in the base portion at different locations and adapted to receive respective guide bolts.

4. The optical fibre mounting structure according to claim 1 wherein the guide formations are positioned at locations substantially around a loop structure.

5. The optical fibre mounting structure according to claim 1 including a cover portion having a mating surface which opposes the vibration surface, wherein during operation, the cover portion is able to be brought into clamping engagement with the base portion such that the length of optical fibre is supported in contact with both the mating surface and vibration surface.

6. The optical fibre mounting structure according to claim 5 wherein the cover portion includes one or more securing formations for securing the cover portion to the base portion, wherein the one or more securing formations includes one or more bolts projecting from the cover portion and positioned to be received in a respective one or more receiving apertures disposed in the base portion when the cover portion and base portion are brought into clamping engagement.

7. The optical fibre mounting structure according to claim 5 wherein the cover portion or base portion include one or more magnets or magnetic regions positioned to bring the opposing portion into magnetic clamping engagement when in close proximity.

8. The optical fibre mounting structure according to claim 5 wherein the mounting apparatus includes a mounting bolt which extends through both the base portion and cover portion and is engagable with a corresponding mounting formation of the support structure, wherein, during a mounting operation, the mounting bolt is configured to bring the base portion and cover portion into clamping engagement to support the length of optical fibre.

9. The optical fibre mounting structure according to claim 1 wherein the mounting apparatus includes a bolt which extends through an aperture in the base portion and is engagable with a corresponding mounting formation of the support structure.

10. The optical fibre mounting structure according to claim 1 wherein the base portion includes an elongated cylindrical member having a circumferential surface defining the vibration surface.

11. The optical fibre mounting structure according to claim 10 wherein the cylindrical member forms part of a pulley wheel structure having an outer surface defining the vibration surface.

12. The optical fibre mounting structure according to claim 1, wherein the fibre engagement structure is formed on the base portion.

13. The optical fibre mounting structure according to claim 1 wherein the distributed system of spaced apart vibration sources includes a conveyor system having a plurality of spaced apart rollers representing the vibration sources.

14. The optical fibre mounting structure according to claim 1 wherein the mounting structure includes an elongate channel member having a bottom section and sidewalls extending upwardly from the bottom section, wherein:

the base portion forms a bottom section of the channel member;
the fibre engagement structure is defined, at least in part, by sidewalls of the channel member; and
the length of optical fibre is able to be supportively engaged in a channel defined by the bottom section and sidewalls of the channel member.

15. The optical fibre mounting structure according to claim 14 wherein the sidewalls of the channel member extend substantially perpendicularly from the bottom section to define a U shaped channel member.

16. The optical fibre mounting structure according to claim 14 wherein distal ends of the sidewalls include inwardly directed retaining lips.

17. The optical fibre mounting structure according to claim 14 wherein the mounting apparatus includes one or more magnetic clamps configured to magnetically engage with the support structure about the elongate channel member.

18. The optical fibre mounting structure according to claim 14 wherein the mounting structure includes one or more engagement clips configured to engage with the support structure about the elongate channel member by one or more screws.

* * * * *